Aug. 5, 1958 J. DE BOURGUES 2,845,696
MODE OF CONNECTION BETWEEN PINIONS AND SHAFTS
Filed April 17, 1953
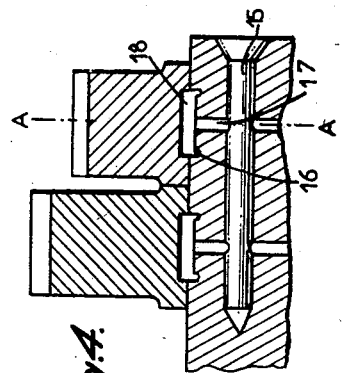
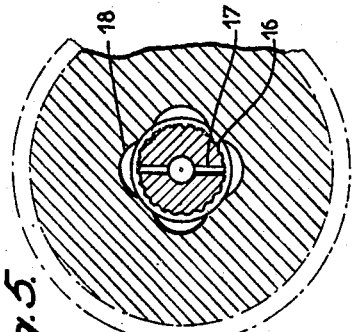
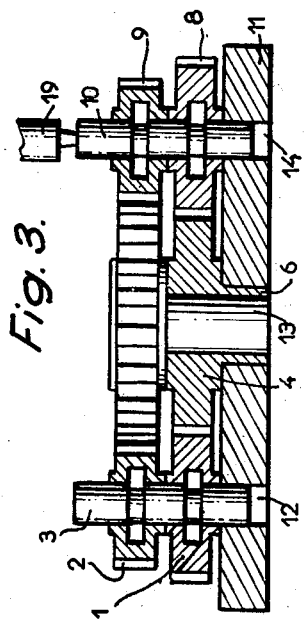
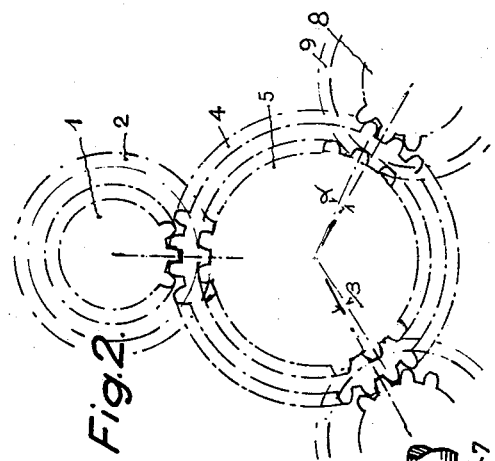
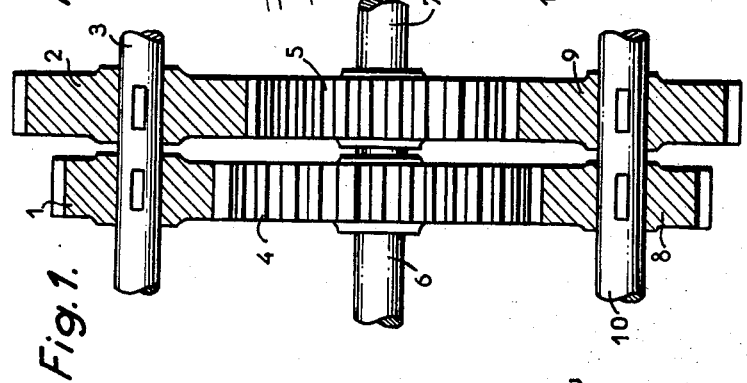
Inventor:
Jacques DE BOURGUES
by: J. Delattre-Seguy
Attorney United States Patent Office 2,845,696
Patented Aug. 5, 1958

2,845,696

MODE OF CONNECTION BETWEEN PINIONS AND SHAFTS

Jacques de Bourgues, Paris, France, assignor to Paul Defontenay, Bourg-la-Reine (Seine), France Application April 17, 1953, Serial No. 349,524

Claims priority, application France September 11, 1952

3 Claims. (Cl. 29—159.2)

In numerous gears, it is usual to obtain variations of speed for rotating shafts by making use of toothed wheels and pinions meshing with each other.

In many cases, it is found necessary to provide the same shaft with at least two keyed pinions, having different numbers of teeth and intended to co-operate with two crown wheels each rigid with one shaft.

If a second set of pinions is to be keyed to another shaft, as will be the case of a sun wheel train having a plurality of planet wheels with external teeth, said keying must be performed with an accuracy so far almost impossible to be attained.

The mode of coupling according to this invention eliminates said drawbacks and permits to obtain gearing mechanisms, particularly of the kind comprising sun wheel trains with a plurality of planet wheels. It has been hitherto impossible to produce such gearing mechanisms within reasonable limits of design and cost.

As a feature of this invention, the elements of the gearing mechanism, namely the shafts and various wheels and pinions, are fastened by molded plastic keys, when said elements have been placed in respective determined positions.

Further details and advantages of the invention will appear from the following description with reference to the accompanying drawing which is only given by way of example to explain how the invention may be carried out in practice.

Figure 1 shows an assembly comprising two sun-wheels and two sets of planet wheels, each of said sets revolving around one of said sun-wheels.

Figure 2 emphasises the difficulties of keying multiple planet wheels.

Figure 3 illustrates how to maintain the elements to be assembled by an adequate mounting so as to be able to accomplish the keying injection.

Figure 4 is a sectional view illustrating the means for rigidly uniting the pinions to the shaft by injecting a hardenable material.

Figure 5 is a section on the line A—A in Figure 4.

As will be seen from Figure 1 which represents a sun-wheel train, the pinions 1 and 2 keyed to the shaft 3 are in mesh with toothed wheels 4 and 5 rigid with the shafts 6 and 7, respectively, said toothed wheels meshing with the pinions 8 and 9, keyed on shaft 10.

On examining Figure 2, it will be seen immediately that a determined keying of pinions 1 and 2 on shaft 3 will depend on one single position to be possibly assumed by pinions 8 and 9 on shaft 10, said position depending on the number of teeth of crowns 4 and 5. The difficulty will increase if instead of sets of two planet wheels for each shaft, three or four pinions will be used in alignment. If the axes of the intermeshing teeth of pinions 1 and 2 are caused to coincide, except in the case of pinions with a multiple number of teeth, the axis of the tooth of planet wheel 8 will be, in fact, different from that of planet wheel 9 keyed on the same shaft. It would be the same for a third set of planet wheels.

Finally, if it is desired to build up assemblies with gearing elements composing a standard train permitting the replacement of an element by another, the problem is such that the solution becomes unconceivable on account of its complexity.

The reason thereof is the mode hitherto applied for fastening an element on a rotating shaft, especially the keying.

Said mode of fastening consists in cutting a longitudinal groove in the shaft and a transverse groove in the element to be fastened, for example a pulley or a pinion, whereupon a key is slipped in so as to fill out the entire volume of both grooves when the latter are caused to coincide.

If two pinions are to be keyed to the same shaft, one single key or at least the same longitudinal groove in the shaft is generally used to this end, so that it is necessary to cut very accurately the transverse groove of the second pinion if the latter is to assume a well defined angular position with respect to the case of multiple planet wheels secured to the same shaft.

These drawbacks are avoided by employing the method according to the invention.

According to said method, use is made of a base 11 suitably pierced with holes to receive the end of the shafts carrying planetary wheels or pinions and a sun-wheel so that shafts may be placed with respect to each other in the same relative position as they are going to assume in the ready assembly.

In Figure 3, for example, the base 11 is pierced with three holes 12, 13, 14, to receive the shafts 3, 6 and 10, respectively.

The pinions 1, 4 and 8 are set in place (it is to be noted that the sun-wheel 4 may be secured to its shaft 6 by means of a steel key); then, the pinions 2 and 9 are slipped over the shafts 3 and 10 and the crown wheel 5 is introduced between said two pinions so that its axis is exactly in the prolongation of the shaft 6.

Of course, the sequence of the operations of assembling is far from being unchangeable; the pinions can be slipped over the shafts before the end of the latter is engaged into the corresponding hole of the base.

It is also possible to apply the method according to the invention in order to fasten either all pinions and wheels or only one or both pinions of the second set and of further sets, if necessary.

In order to obtain the fastening according to the invention, it is necessary to drill out the shaft carrying the elements to be rigidly united with said shaft. Figures 4 and 5 show this disposition: the shaft 3 carrying the planet pinions is pierced with a longitudinal duct 15 that opens to the outside. A peripheral groove 16 is cut in the shaft at the place to be assumed by the pinion. A duct 17 connects said groove 16 to the axial duct 15.

The pinion to be secured to its shaft is provided with at least one groove 18 transversely to its axis; preferably, said groove does not extend to its flanks.

It will be easily understood that this disposition may be inverted. In this event, the grooves are provided on the shaft and the peripheral groove is provided in the bore of the element to be secured.

In order to reinforce the adhesion, the bottom of the peripheral groove and/or the bottoms of the axial grooves are milled.

This assembly is now placed on the table of a machine for injecting the plastic materials, natural or synthetic resins, the nozzle 19 coinciding with the orifice of the axial duct 15.

It suffices to inject a certain quantity of material which will flow through the ducts 15 and 17 and fill out the cavity delimited by the peripheral groove 16 and the grooves 18.

The further operations are those generally known in all injection moulding processes.

In the event that several shafts of the same assembly are to be "keyed" in this manner, the operation of injection is to be repeated by displacing the nozzle 19 without modifying the position of the elements on the base 11 or by employing a plurality of nozzles.

The material that is to constitute the "key" being injected while the elements are in their relative position of operation, it will be easily understood that the novel method cannot give rise to any inaccuracy or difficulty.

It is to be noted that the elements fastened in this manner to the shafts are solidly retained both in the angular and longitudinal directions.

Finally, a suitable selection of the nature of the material to be injected permits to obtain effects that cannot be obtained with the setting by means of steel keys.

Thus it is possible to obtain assemblies endowed with a certain angular resilience which obviates seizing and breaking of mountings capable of being dismantled by the softening of the material, etc.

What I claim is:

1. A method for fixing on a first shaft in accurate relative angular positions at least one of a first pair of pinions for use as planet wheels in a multiple wheel train comprising also at least two sun wheels and a second pair of pinions fixed on a second shaft and meshing with said sun wheels, said method comprising: forming on the bore of one pinion of said first pair at least one inner groove; forming on the periphery of said first shaft at least one circular groove; said inner groove and said circular groove being in communication and forming a cavity when said pinion is placed correctly on said first shaft; providing said first shaft with an axial duct and with at least one radial duct communicating with said axial duct and with said circular groove; assembling said first pair of pinions on said first shaft, said first pair of pinions meshing with said sun wheels; injecting a bonding thermoplastic resin into said cavity through said ducts, and maintaining said first pair of pinions on said first shaft at said meshing position during said injection and until said bonding thermoplastic resin has solidified and set.

2. A method as claimed in claim 1, in which said bonding thermoplastic resin is a resilient thermoplastic resin.

3. A method as claimed in claim 1, in which said bonding thermoplastic resin is a superpolyamid resin.

References Cited in the file of this patent

UNITED STATES PATENTS

| | | |
|---|---|---|
| 1,251,973 | Kurtz | Jan. 1, 1918 |
| 2,255,184 | Osenberg | Sept. 9, 1941 |
| 2,411,398 | Wallace | Nov. 19, 1946 |

FOREIGN PATENTS

| | | |
|---|---|---|
| 131,134 | Great Britain | Aug. 12, 1919 |